Oct. 18, 1966     R. F. GIORDANO     3,279,293
SHEARING APPARATUS WITH GAUGE STOPS
Original Filed June 4, 1963     2 Sheets-Sheet 1

Inventor
Roger François Giordano by Michael S. Striker

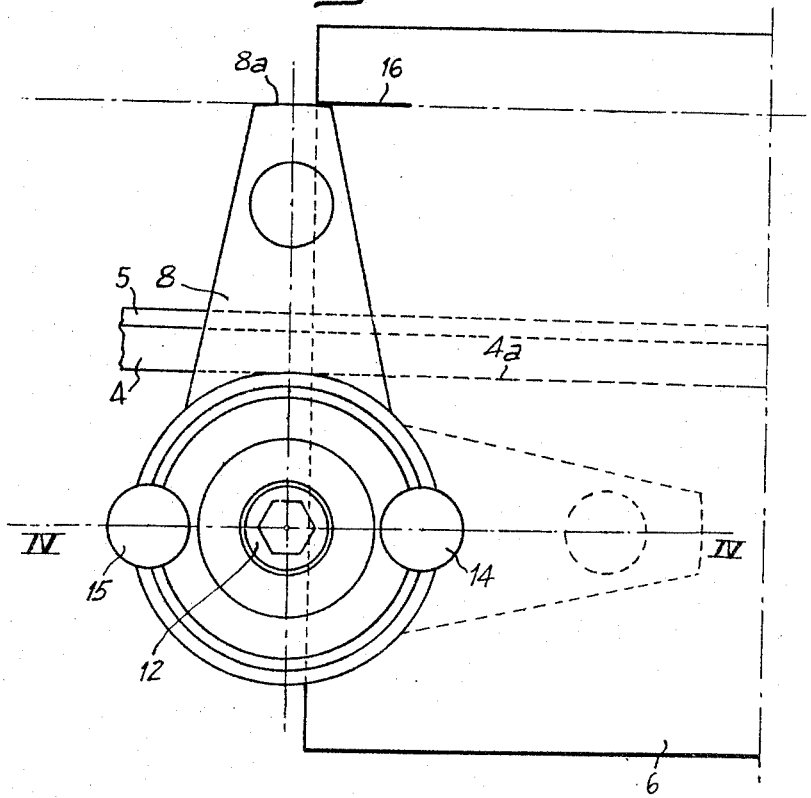
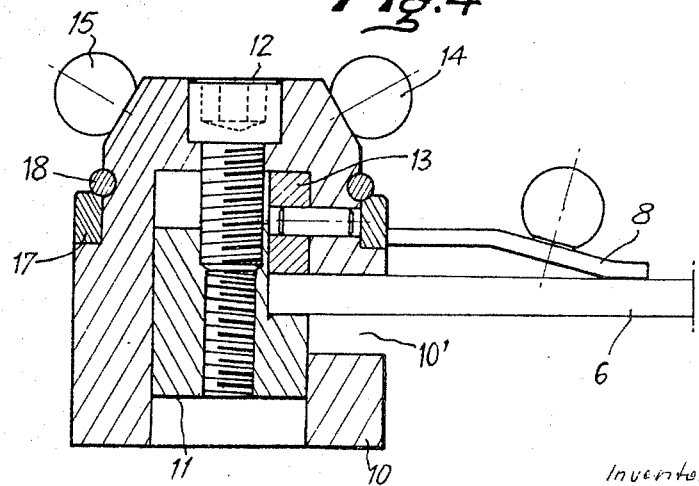

United States Patent Office 3,279,293
Patented Oct. 18, 1966

3,279,293
SHEARING APPARATUS WITH GAUGE STOPS
Roger F. Giordano, 2 Rue Pasteur, Deuil-la-Barre, France
Original application June 4, 1963, Ser. No. 285,260. Divided and this application Mar. 8, 1966, Ser. No. 532,770
Claims priority, application France, June 8, 1962, 900,165; June 14, 1962, 900,719; Mar. 29, 1963, 929,738
10 Claims. (Cl. 83—467)

The present application is a divisional application of the copending application filed June 4, 1963, with the Serial No. 285,260.

The present invention relates to sheet metal working apparatus such as shearing apparatus or the like for shearing plate material or sheet metal or for acting on such material along a predetermined working line.

More specifically, the present invention relates to a shearing apparatus or the like having adjustable back stops located adjacent a pair of shearing blades, that is a fixed lower and a movable upper blade so that a plate to be cut can be located in a selected position relative to the shear blades. The adjustable stops which properly position the material to be cut relative to the cutting edges of the shearing apparatus may either be fastened in adjustable position onto the frame of the shearing apparatus, or the stops may also be fastened onto the plate material to be sheared to be subsequently brought in abutment with abutment means on the shearing apparatus so as to properly locate the plate material to be sheared with respect to the shearing blades.

The present invention relates more specifically to stops or gauges which can be fixed in proper position on the material to be sheared so as to properly locate the material to be sheared in the shearing apparatus relative to the shearing blades.

It is an object of the present invention to provide for stops or gauges which can be easily fixed to the material to be sheared and by means of which the material to be sheared can be properly positioned in the shearing apparatus so that the shear blades will cut the material along a predetermined working line.

It is an additional object of the present invention to provide for such positioning gauges which are constructed in such a manner that the gauge when attached to the material to be cut will not interfere with the cutting operation.

It is a further object of the present invention to provide for such gauges which can be positioned relative to a working line marked on the material to be cut in very efficient manner.

With these objects in view, the present invention mainly comprises an arrangement including a sheet metal working apparatus having an elongated member having a working face to be aligned with a working line of a sheet metal member to be worked on so that the movable member may engage the sheet metal along the working line, and abutment means substantially parallel to the working face and spaced a given distance from the latter, and at least one gauge for facilitating alignment of the working face of the movable member with the working line of the sheet metal member. The gauge itself preferably comprises a body having an abutment face adapted to abut against said abutment means of the sheet metal working apparatus, a gauge arm having a free end and being mounted on the body movable between an active aligning position in which the free end is spaced in a direction normal to the working line said given distance from the abutment face and an inactive position, and means for clamping the body to an edge portion of the sheet metal transverse to the working line in a position so that the free end of the gauge arm in the active position of the latter is located at the aforementioned working line of the sheet metal member, whereby the working face of the movable member may be aligned with the working line of the sheet metal member by placing the abutment face of the gauge in abutment with the abutment means on the apparatus and the gauge arm may then be moved to an inactive position so that the gauge arm will not interfere with the movable member while the latter acts on the sheet metal.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a top view drawn to an enlarged scale and illustrating a gauge according to the present invention applied to a plate member; and FIG. 4 is a cross section taken along the line IV—IV of FIG. 3.

Figure 1:
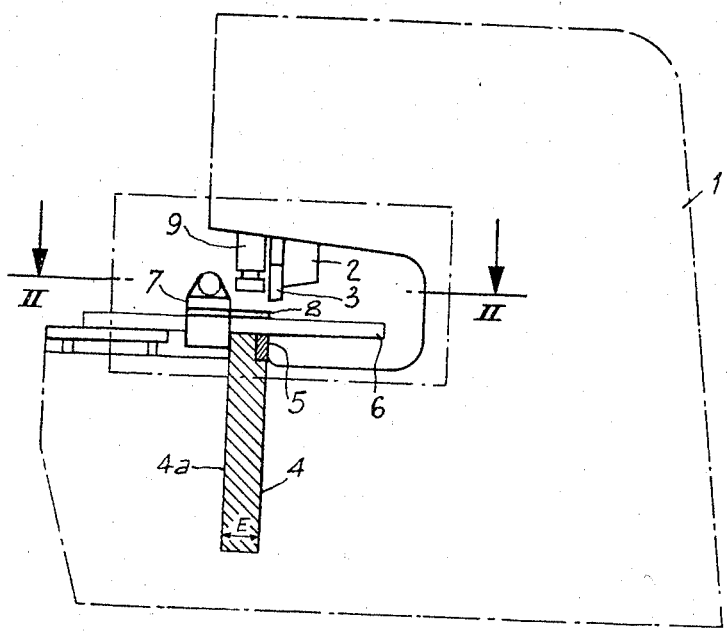
FIG. 1 is a schematic cross sectional view taken along the line I—I of FIG. 2 and showing the shearing apparatus as well as two stop gauges applied to a plate member to be sheared.
Figure 2:
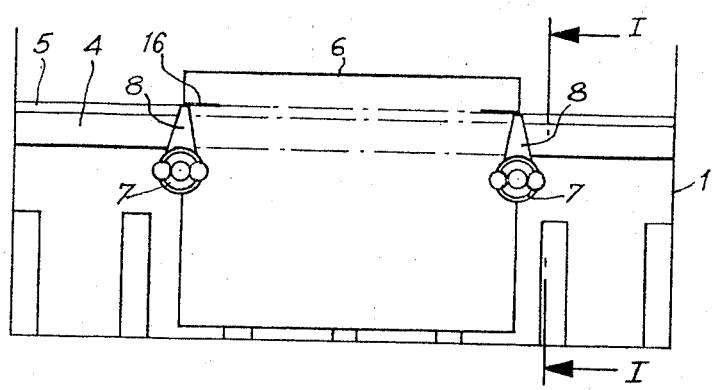
FIG. 2 is a cross sectional view taken along the line II—II of FIG. 1.

Referring now to the drawings and more specifically to FIGS. 1 and 2, it will be seen that the shearing apparatus schematically illustrated in these two figures, comprises a frame 1 having an upper movable apron 2 on which upper movable shearing blade 3 is mounted and a lower stationary apron 4 on which the lower stationary shearing blade 5 is mounted. The upper apron 2 and the shearing blade 3 mounted thereon are movable by means known in the art and not illustrated in the drawing so that the upper shearing blade 3 may be moved from the open position shown in FIG. 1 to a cutting position in which the cutting edge of the upper shearing blade 3 cuts through a plate or sheet metal member 6 placed between the edges of the shearings blades when the latter are in the open position.

In order to properly align the plate or sheet metal member 6 with the cutting edges of the shearing blades 3 and 5, at least one, but preferably two gauges 7, the construction of which will be described later on in detail, are clamped to opposite edge portions of the plate or sheet material 6 in such a manner that the free ends of the gauge arms 8 provided on each gauge are aligned with a working line 16 marked on the plate or sheet metal member 6 along which the plate has to be cut.

Each of the gauges 7 comprises, as best shown in FIGS. 3 and 4, a substantially cylindrical hollow body 10 closed at the top and formed at one side thereof with a transverse slot 10' extending from the outer surface of the body 10 into the central bore thereof so that the edge portion of a sheet metal or plate member 6 may be inserted into the slot 10'. A pair of clamping jaws 11 and 13 are located in the interior of the hollow body 10 so that the latter may be clamped onto an edge portion of a plate member 6 extending through the slot 10' in the body. The upper clamping jaw 13 is preferably stationary and may be fixed to the body for instance by a dowel pin as shown in FIG. 4, whereas the lower clamping jaw 11 is slidably guided in the central bore of the body 10 and formed with a central threaded bore in which the screw thread of a tightening screw 12 extending through the upper end of the body into the latter is threadingly engaged so that by turning of the screw 12 in one direction the lower clamping jaw 11 may be moved relative to the upper stationary clamping jaw to clamp thereby the edge portion of the plate 6 tightly between the opposite faces of the clamping jaws 11 and 13. The body 10 is preferably provided at the upper end thereof with a pair of wings 14 and 15 so that the body 10 may be held stationarily while the screw 12 is tightened. The body 10 has preferably a lower portion of a larger diameter than an upper portion thereof to form at the upper end of the lower portion an annular shoulder face on which the bottom face of a ring 17 located about the upper portion of the body rests. The ring 17 may be held against displacement in upward direction by a snap ring 18 located in a groove of the body and engaging the upper face of the ring. A gauge arm 8 fixed to the ring 17 projects in substantial radial direction therefrom and the gauge arm 8 has a free end face 8a adapted to be aligned with the working line 16 marked on the plate or sheet metal member 6. The free end 8a of the gauge arm 8 is spaced from the peripheral surface of the lower portion of the body 10 a distance which, as can be ascertained from FIG. 1, is equal to the distance E, that is the distance the front face of the stationary apron a is spaced from the cutting edge of the stationary blade 5.

The arangement above described is used as follows:

The working line 16 along which the plate member or sheet metal member 6 has to be cut by the shearing apparatus is preferably marked on the plate 6 and the two gauges 7 are then clamped on opposite edges of the plate in such a manner that the free ends 8a of the gauge arms 8, while the arms extend substantially normal to the marked line 16, are located on the line 16 as shown in FIGS. 2 and 3. The two gauges are then clamped in position on the opposite edge portions of the plate 6 by tightening the screws 12 and the plate member 6 with the gauges fixed to opposite edge portions thereof is then placed between the open shear blades in such a manner that the lower portions of the gauge bodies 10 will abut, as shown in FIG. 1, against the front face 4a of the lower apron 4 which forms an abutment means. The plate 6 is then preferably clamped in position by a hydraulic jack 9 of known construction provided on the shearing apparatus while the gauges 7 are maintained in abutting relationship against the front face 4a of the lower apron 4. Subsequently thereto the gauge arms 8 are turned from the active aligning position shown in full lines in FIG. 3 through an angle of for instance 90° to the inactive position, shown in dotted lines in FIG. 3, and then the shearing apparatus is actuated so that the upper shearing blade 3 cuts through the properly located plate 6. After the cut is performed the upper blade 3 will return to its open position as shown in FIG. 1 and the above-described operations are repeated for the next cut.

It will be understood that each of the elements described above, or two or more together, may also find a useful application in other types of sheet metal working apparatus differing from the types described above.

For instance the above described gauges may also be used not only in combination with shearing apparatus as described above but also in combination with sheet metal bending apparatus or similar apparatus in which a sheet metal or similar material is worked on a predetermined working line.

While the invention has been illustrated and described as embodied in a shearing apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An arrangement of the character described comprising a sheet metal working apparatus having an elongated movable member having a working face to be aligned with a working line of a sheet metal member to be worked on so that said movable member may engage the sheet metal member along said working line, and abutment means substantially parallel to said working face and spaced a given distance from the latter; and at least one gauge for facilitating alignment of said working face of said movable member with the working line of the sheet metal member, said gauge comprising a body having an abutment face adapted to abut against said abutment means of said apparatus, a gauge arm having a free end and being mounted on said body movable between an active aligning position in which the free end is spaced in a direction normal to the working line said given distance from said abutment face, and an inactive position; and means for clamping said body to an edge portion of said sheet metal member transverse to said working line in a position so that said free end of the gauge arm in said active position of the latter is located at said working line of said sheet metal member, whereby the working face of said movable member may be aligned with said working line of the sheet metal member by placing said abutment face of said gauge in abutment with said abutment means on said apparatus and said gauge arm then be moved to said inactive position so that the gauge arm will not interfere with the movable member while the latter acts on the sheet metal member.

2. An arrangement as set forth in claim 1, wherein said gauge arm is mounted on said body turnable about an axis.

3. An arrangement as set forth in claim 1, wherein said gauge arm is mounted on said body turnable about an axis substantially normal to said sheet metal member on which it is clamped.

4. An arrangement as set forth in claim 1, wherein said body is formed with a transverse slot adapted to receive the edge portion of the sheet metal member, and wherein said clamping means are arranged within said body.

5. An arrangement as set forth in claim 4, wherein said body is hollow and closed at one end thereof, and wherein said clamping means comprise a fixed jaw abutting against said closed end of said body, a movable jaw formed with a threaded bore, and an operating screw extending through an opening in said closed end of said body and being threadingly engaged in said threaded bore.

6. An arrangement as set forth in claim 1, wherein said body is a substantially cylindrical body, and wherein said gauge arm is mounted in the region of one end thereof turnable about the axis of said cylindrical body.

7. An arrangement as set forth in claim 1, wherein said body is a substantially cylindrical body having a lower portion of a larger diameter than an upper portion thereof so as to form an annular shoulder face at the upper end of said lower portion, and including a ring surrounding said upper portion of the body and having a bottom face abutting against said shoulder face, said gauge arm being fixed to said ring projecting in substantial radial direction therefrom.

8. An arrangement as set forth in claim 5, wherein said hollow body has a lower cylindrical portion of larger diameter than an upper portion thereof so as to form an annular shoulder face on the upper end of the lower portion and including a ring member surrounding said upper portion of said body and having a bottom face abutting again at said shoulder face, said gauge arm being fixed to said ring projecting in substantial radial direction therefrom.

9. An arrangement as set forth in claim 1 and including a second gauge of the same construction as said one gauge and adapted to be clamped on an edge portion of the sheet metal opposite to said one edge portion thereof.

10. An arrangement as set forth in claim 1, wherein said sheet metal working apparatus is a shearing apparatus having a stationary blade and a movable blade forming said elongated movable member, and wherein said abutment means is formed by an apron supporting said stationary blade.

References Cited by the Examiner

UNITED STATES PATENTS 2,026,145   12/1935   Taylor _____ 83—522

FOREIGN PATENTS 1,035,448   7/1958   Germany.

ANDREW R. JUHASZ, *Primary Examiner.*